Patented Dec. 11, 1928.

1,695,197

UNITED STATES PATENT OFFICE.

DAVID R. MERRILL, OF BERKELEY, CALIFORNIA, ASSIGNOR TO UNION OIL COMPANY OF CALIFORNIA, OF LOS ANGELES, CALIFORNIA, A CORPORATION OF CALIFORNIA.

EMULSIFIABLE OIL.

No Drawing. Application filed June 14, 1923. Serial No. 645,357.

My invention relates to making soluble or emulsifiable oils or emulsifiers, the same being oils, or oil compounds, capable of ready dispersion or emulsifiable in cold water with slight agitation, whereby a stable emulsion is formed.

The principal object of my invention is to produce a relatively stable emulsion by compounding an aliphatic hydroxyl derivative with naphthenic soaps and dispersing the compound in water, whereby the emulsion will maintain its permanency no matter to what extent it may be diluted.

Another object of my invention is the use of waste products from refining crude petroleum, the same being the naphthenic acids, or their soaps such as sodium naphthenate, aluminum naphthenate and other soaps, of which the sodium naphthenates are especially preferred.

Alkali naphthenates such as sodium naphthenate being water soluble tend to produce oil-in-water emulsions and are, therefore, more suitable for the formation of diluted emulsions of the type known as soluble oils, and aluminum naphthenate being oil soluble produces water-in-oil emulsions.

Naphthenic acids may be obtained from the waste alkali washes in petroleum refineries, being contained in the same as partly saponified products, in a number of ways, such as are described in the patents of L. L. Rebber, No. 1,582,227, and De R. Frizell, No. 1,582,258.

These acids are oxidation products of the naphthene series $C_nH_{2n}$, which are naturally present in petroleum distillates, or are formed by the oxidizing action of the sulphuric acid used in purifying petroleum products, or by other oxidizing agents, and consist of a hydrocarbon radical, or a substituted hydrocarbon radical, in combination with a carboxyl group and of which hexahydrobenzoic acid, $C_6H_{11}COOH$, may be taken as illustrative, and generally include carboxylic acids corresponding with the hydrocarbons present in the so-called naphthene base petroleums.

In the refining of petroleum distillates, the distillates are treated with sulphuric acid and the acid sludge, containing the sulphonic acids and sulphonates, is drawn off, naphthenic acids being formed at the same time and remain in the distillates. The distillates are then treated with an alkali, such as the alkali metal hydroxides, preferably sodium hydroxide, and the waste alkali containing the naphthenic acids and naphthenates is drawn off.

The naphthenic acids and naphthenates are present in the waste alkali in a partly saponified condition, and in order to recover them therefrom, I preferably treat the waste alkali with sulphuric or other strong mineral acid, whereupon the naphthenates are broken up into naphthenic acids and together with the naphthenic acids previously present are thrown out of solution and recovered in any suitable manner.

Saponification is then effected by further treating the naphthenic acids with strong sodium hydroxide (e. g. 40° Bé.), and the sodium naphthenic soaps so formed are heated and stirred to drive off excess moisture reducing the water content to approximately 8% or less and further mixed with butyl alcohol in the proportion of about seventeen parts by volume of butyl alcohol to seventy parts of the sodium naphthenates by volume, but I do not hereby limit myself to the above proportions inasmuch as I have found other proportions to be equally valuable, the above mentioned proportions being merely illustrative as the most effective for the particular naphthenates used.

The resulting product is mixed in varying proportions with mineral oils to form a soluble oil, the proportions varying with the mineral oil taken for a specific use and I find I can use a light oil, such as kerosene, or a heavy oil such as crude oil, with equally good results for any particular class of work, and as illustrative of a particularly desirable mixture, I take thirty parts of the above resulting product and mix the same with seventy parts by volume of a mineral oil having a viscosity of 100 seconds Saybolt at 100° F. and obtain thereby a readily soluble oil which, with slight agitation is easily emulsified in water, forming an emulsion which remains stable when diluted with water to any extent.

Such emulsions are used in the treatment of wools, sprays for fruit trees, sheep dips, cordage oils, a substitute for Turkey-red oils, lubricants, etc.

Corresponding results are obtained by the compounding of sodium naphthenates with butyl alcohol and an oil of vegetable or animal origin, such as cottonseed or fish oils, but in general the stability of emulsions made from soluble oils of purely mineral origin is greater than that made from oils made from part mineral and part vegetable or animal origin, and I preferably make my soluble oils with the sodium naphthenates obtained from a particular stock and a distillate prepared from that stock, or a similar stock.

However, in either case, the use of butyl alcohol with naphthenates increases the stability of emulsions, in comparison with their stability when prepared by other methods, and of the four isomeric forms of butyl alcohol, which is an aliphatic hydroxyl derivative having a formula $C_4H_9.OH$, I preferably use normal butyl alcohol which is substantially anhydrous, but I may use the other isomers as well as other alcohols with various oils, particularly the higher alcohols as amyl alcohol, because the alcohols with lower carbons content than butyl alcohol such as ethyl alcohol, form emulsions which are not stable under the same conditions. The desirability of substantially anhydrous alcohol for this purpose is due to the fact that in many instances there is a strong tendency for the soluble oil to separate into two phases before dilution when an alcohol containing material amounts of water is used.

The emulsions made from my soluble oils easily pass all Government tests, which require that polished brass or copper must not turn green after standing in an emulsion twenty-four hours, and that polished steel must not be corroded after standing in an emulsion twenty-four hours and without removing the adhering emulsion, shall then be allowed to dry in still air at room temperature.

In my invention the higher alcohols, such as butyl alcohol, are used as common solvents for the naphthenates and mineral oils, whereby emulsions with water may be made, with the further result that the product has but a very slight odor which is easily masked by the addition of perfumes.

Many soluble oils made are unsuited for use on account of their odor, but my product is not objectionable on this account and passes Government tests which call for a soluble compound free from disagreeable odors, sediments, or ingredients injurious to persons using the same.

I claim:—

1. An emulsifiable oil comprising a naphthenic soap, mineral oil, and a substantially anyhdrous aliphatic alcohol.

2. An emulsifiable oil comprising oil containing in solution a naphthenic soap and a substantially anhydrous aliphatic alcohol.

3. An emulsifiable oil comprising a naphthenic soap, mineral oil, and a substantially anhydrous aliphatic alcohol having more than two carbon atoms.

4. An emulsifiable oil comprising oil containing in solution a naphthenic soap and a substantially anhydrous aliphatic alcohol having more than two carbon atoms.

5. An emulsifiable oil comprising a naphthenic soap and butyl alcohol dissolved in oil.

6. A soluble oil comprising mineral oil, a naphthenic soap and butyl alcohol.

7. A soluble oil comprising sodium naphthenate soap and a substantially anhydrous normal butyl alcohol dissolved in a mineral oil.

8. A soluble oil comprising a naphthenic soap and butyl alcohol in an oil, the alcohol being substantially anhydrous.

9. A soluble oil comprising a mixture of about seventeen parts by volume of a substantially anhydrous aliphatic alcohol having more than two carbon atoms and about seventy parts by volume of sodium naphthenate soap of which mixture about thirty parts by volume are dissolved in about seventy parts by volume of a mineral lubricating oil.

Signed at Oleum, in the county of Contra Costa and State of California, this 4th day of June, A. D. 1923.

DAVID R. MERRILL.